K. RUCH.
LAWN MOWER.
APPLICATION FILED JULY 13, 1911.
1,028,063.
Patented May 28, 1912.
2 SHEETS—SHEET 1.
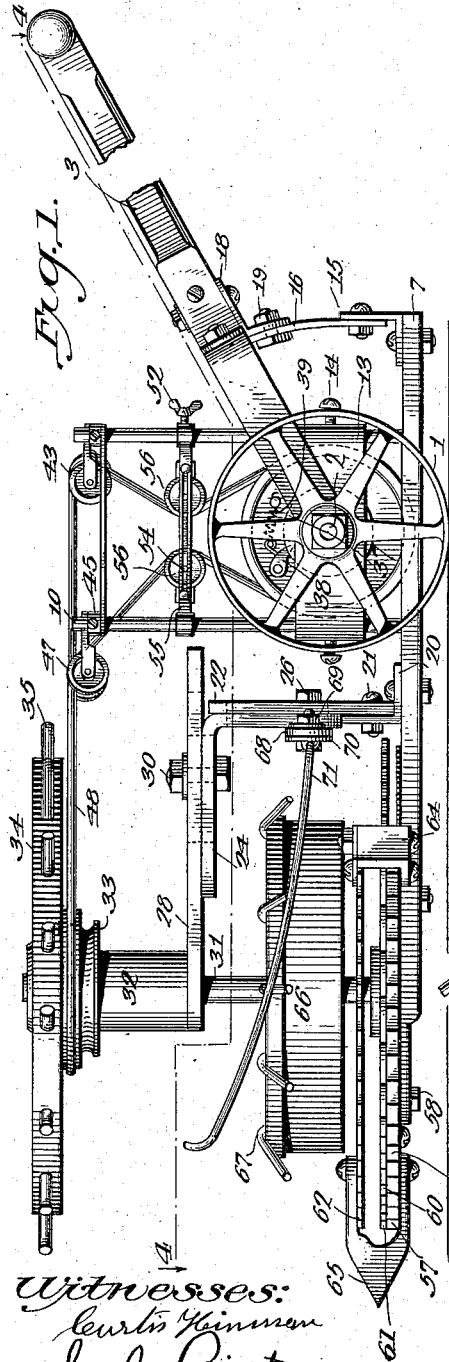
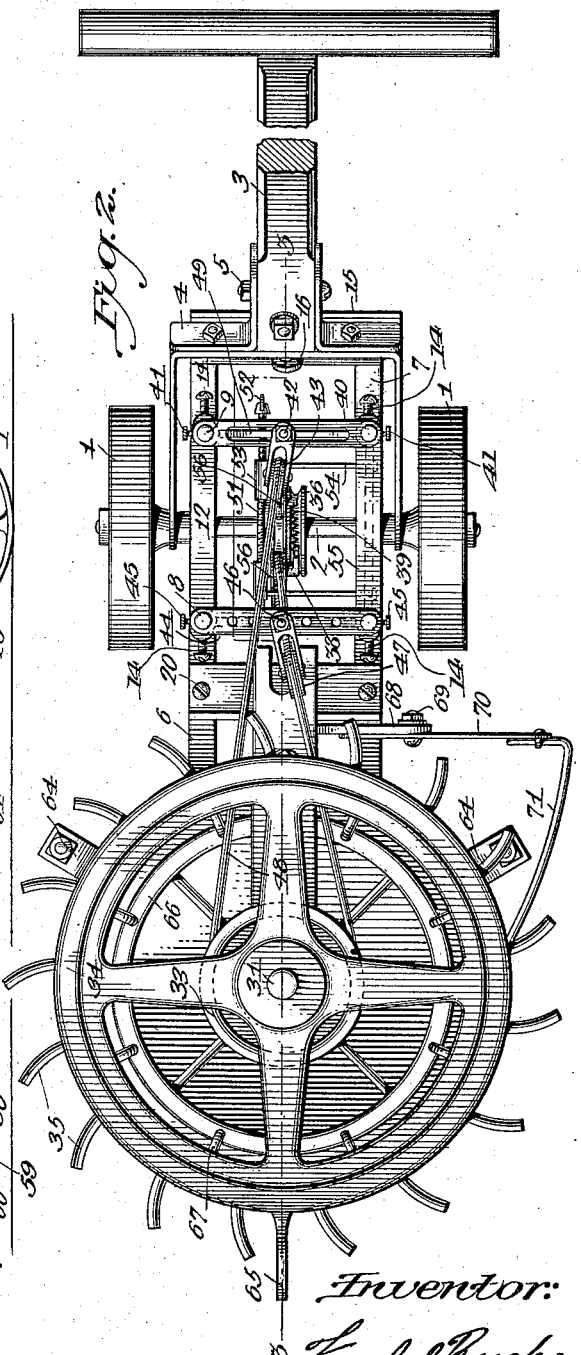
Witnesses:
Inventor:
Karl Ruch.

K. RUCH.
LAWN MOWER.
APPLICATION FILED JULY 13, 1911.
1,028,063.
Patented May 28, 1912.
2 SHEETS—SHEET 2.
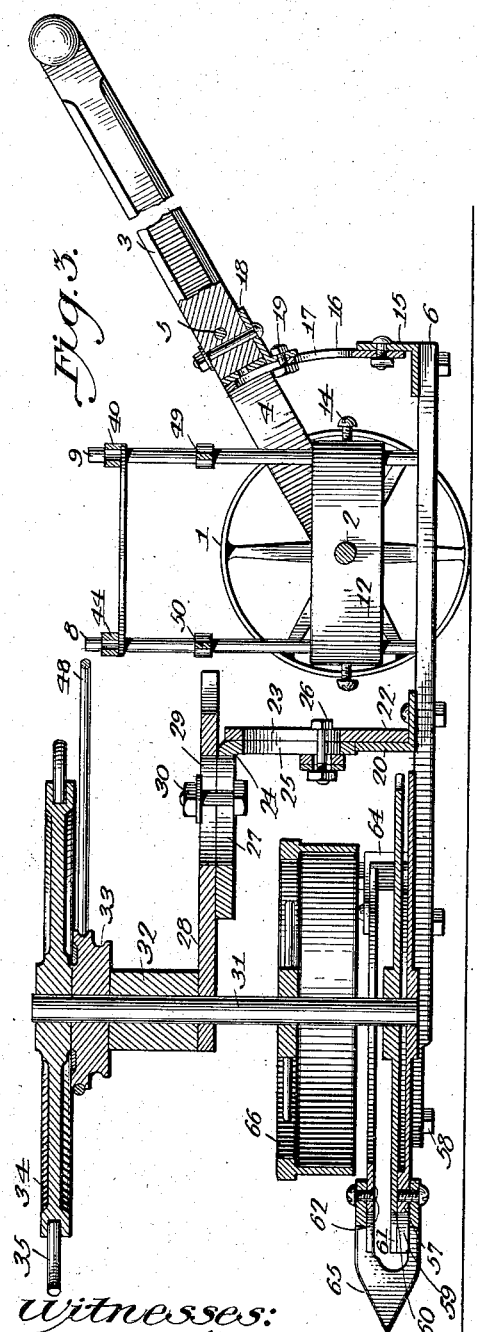
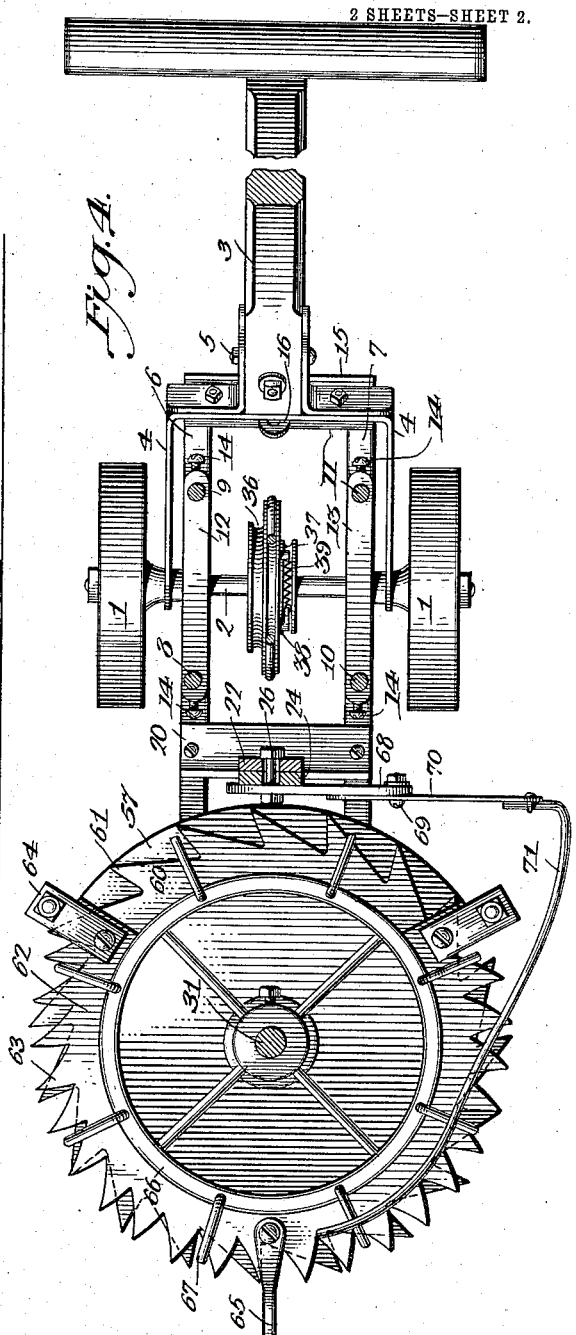
Witnesses:
Curtis Hinman
Ira D. Priest.
Inventor:
Karl Ruch.

UNITED STATES PATENT OFFICE.

KARL RUCH, OF AKRON, OHIO.

LAWN-MOWER.

1,028,063.  Specification of Letters Patent.  Patented May 28, 1912.

Application filed July 13, 1911. Serial No. 638,419.

*To all whom it may concern:*

Be it known that I, KARL RUCH, a citizen of the United States, residing at Akron, in Summit county, State of Ohio, have invented a new and useful Lawn-Mower, of which the following is a specification.

This invention relates to improvements in lawn-mowers and it has for its object the provision of a lawn-mower having a cutting-knife supported for horizontal revolution as contradistinguished from that type of lawn-mower in which the cutting-blade or sweep is mounted to revolve on a horizontal axis.

A further object is to provide the device with means for effectually holding the grass or foliage to be cut during the cutting operation and provided with sweeps or cleaners for moving the severed grass aside so as not to fall into the path of the cutting-knife after being severed from the ground.

Another object is to so construct the device that the entire weight thereof will be imposed upon a pair of ground-wheels which support the device to thereby increase the driving properties of the wheels and insure greater certainty of the continuous revolution of the cutting-knife during the operation of the lawn-mower.

A still further object is to provide means for tightening or changing the position of the belt used for transmitting motion from the driving-wheels to the cutting-knife, said means being capable of being regulated as to speed so that the rotation of the cutting-knife may be controlled within reasonable limits.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1, is a view in side elevation of a lawn-mower embodying this invention; Fig. 2, is a plan; Fig. 3, is a view in vertical section on line 3—3 of Fig. 2; and, Fig. 4, is a view in horizontal section approximately on line 4—4 of Fig. 1.

Referring to the drawings in detail the reference numerals 1, 1 designate a pair of ordinary ground-wheels united by a horizontal-axle 2 on which the ground-wheels are fixedly secured. The device is manipulated by means of a handle 3 the lower end of which is provided with a pair of outwardly-spreading angle-irons 4, the lower ends of which are apertured to receive the axle 2. The handle 3 is of ordinary construction and the angle-irons are preferably secured to its lower end by hold-fast devices 5. Below and at right-angles with the axle 2 are a pair of longitudinally-extending frame-forming parallel bars 6 and 7 adapted to lie parallel with the ground and at a suitable distance therefrom. Extending upwardly from the bar 6 are a pair of cylindrical posts 8 and 9 and extending upwardly from the bar 7 are a similar pair of parallel posts 10 and 11. Extending between the posts 8 and 9 and between the posts 10 and 11 are a pair of oppositely disposed parallel cross-bars 12 and 13, respectively. These bars are similar in all respects and are provided with vertical openings through which the respective posts extend and on which said cross-bars are vertically-slidable. The cross-bars are held against movement and in a fixed position through the medium of set-screws 14 which engage the posts for that purpose. The bars 12 and 13 are provided centrally with apertures through which the horizontal axle 2 extends and through the connected mechanism support the bars 6 and 7 of the frame. The distance between the bars of the frame and the ground can be varied to suit the requirements to which the device is to be put and when this is determined the frame can be locked against movement by means of the set-screws 14. Extending across and serving to connect the longitudinal bars 6 and 7 at their rear ends is an angle-plate 15, to which is secured by a bolt or otherwise an upwardly-extending arm 16 provided with a vertically-extending slot 17. The upper portion of the arm 16 is curved in an arc of which the center of the axle is the center. Mounted preferably on the under face of the handle 3 is an L-shaped member 18 provided with a clamping-bolt 19 extending through the slot 17 and capable when said bolt is manipulated to clamp the arm 16 against the member 18 for frictionally supporting the handle 3 in a selected position.

Extending between the longitudinal bars 6 and 7 of the frame in front of the axle 2 is an angle-plate 20 preferably secured by means of bolts or otherwise to the bars 6 and 7 and provided with an upright portion to which is secured by means of a bolt 21 an upwardly-extending standard 22 having a vertical slot 23 therein. Secured to the front face of the standard 22 is an L-shaped member 24 provided with a vertical slot 25 approximately in alinement with the slot 23. The L-shaped member 24 is secured to the standard 22 by means of a bolt 26 extended through the slots 23 and 25 to permit the vertical adjustment of the L-shaped member 24 with respect to the standard 22. The upper or horizontal portion of the L-shaped member 24 is provided with a slot 27 extending longitudinally of the machine. Mounted on the upper face of the horizontal portion of the L-shaped member 24 is a horizontal arm 28 also provided with a slot 29 in alinement with the slot 27, and in these two slots is positioned a clamping-bolt 30 for adjustably securing the arm 28 to the horizontal portion of the L-shaped member. The outer or forward end of the arm 28 is provided with a vertical aperture constituting a bearing for a vertical rotatable shaft 31 the lower end of which is supported by means to be later described. Mounted on the upper face of the arm 28 and apertured to receive the shaft 31 is a spacing sleeve 32 which serves to support a double-grooved sheave 33 fixedly mounted on the shaft 31. The grooved portions of the sheave 33 differ in diameter for a purpose to be later described.

Fixedly mounted on the shaft 31 above the sheave 33 is a wheel of ordinary construction provided on its periphery with a plurality of curved arms 35 all bent in a similar direction with their ends pointing forwardly in the direction of the rotation of the wheel to constitute rake-members for a purpose to be later described, and for convenience this wheel will be denominated hereafter as a "rake-wheel."

Loosely mounted on the axle 2 is a sheave 36 provided with two grooved peripheral portions, which differ in diameter for a purpose to be later described. Fixedly mounted on the axle 2 and adjecent to the sheave 36 is a ratchet-wheel 37 the teeth of which are adapted to be engaged by a pawl 38 pivotally secured on the lateral face of the sheave 36 and normally held in contact with the ratchet-teeth on the wheel 37 through the medium of a resilient element 39. From this latter construction it will be evident that as the machine is pushed forward the engagement between the ratchet-teeth and the pawl on the sheave will cause a corresponding movement of the sheave 36 and when the mower is moved rearwardly the pawls will run over the teeth of the ratchet-wheel and the sheave will be inoperative.

Extending between the posts 9 and 10 and shiftably mounted thereon is a slotted cross-bar 40 held in an adjusted position through the medium of set-screws 41. Mounted in the slot in the bar 40 is a post 42 bearing a pivotally-mounted grooved pulley 43. Extending between the posts 8 and 10 and vertically-shiftable thereon is a cross-bar 44 secured in an adjusted position through the medium of set-screws 45. This bar is provided with a plurality of vertically-extending apertures any one of which is adapted to receive the lower end of a post 46 bearing a pivotally-mounted grooved pulley 47.

The mechanism for rotating the shaft 31 comprises a belt 48 which is passed around the sheave 33, over the pulley 43, around the sheave 36, upwardly over the grooved pulley 47, to the sheave 33, so that as the machine is moved forward the shaft 31 is revolved. It will be apparent that if the belt 48 is shifted from its position on the larger grooved portion of the sheaves 33 and 36 a change in speed will result in the rotation of the shaft 31, that is to say, if the belt is placed on the smaller portion of the pulley 36 and on the larger portion of the pulley 33 the speed of rotation of the shaft will be reduced, and on the other hand, if the belt is placed on the larger portion of the sheave 36 and on the smaller portion of the sheave 33 the speed of rotation of the shaft 31 will be increased.

Experience has shown that, it is desirable to incorporate a light and convenient belt-tightener for maintaining the belt 48 in a taut condition at all times in order to insure prompt rotation of the shaft 31 when the mower is started, and a preferred form of belt-tightener comprises a cross-bar 49 extending between the posts 9 and 11 and a similar bar 50 extending between the posts 8 and 10. Extending between the bars 49 and 50 and rotatably mounted therein is a right and left hand screw 51 operated by means of a thumb-nut 52. Mounted on the threaded portions of the shaft 51 are interiorly-threaded nuts 53 each of which is provided with a transversely-extending pin 54 the outer ends of which are adapted to travel in a slotted bar 55 extending between the posts 10 and 11. The slot in this bar constitutes guiding means for the ends of the pins 54 and also serves to prevent the nuts from being rotated when shifted toward and away from each other through the rotation of the shaft 51 by the thumb-nut 52. Mounted on each of the nuts 53 is a grooved idler-pulley 56 the function of which is to engage the belt at points between the pulleys 47 and 43 and the sheave 36 and press the same inwardly to maintain it taut and take up slack therein.

Extending across the front ends of the bars 6 and 7 and projecting forwardly therefrom is a circular plate 57 held in position through the medium of hold-fast devices such as bolts 58. The front and lateral portions of the edge of this plate are provided with teeth 59 for a purpose to be later described. The central portion of this plate is apertured to receive and form a bearing for the lower end of the vertical shaft 31. The toothed portion of this plate 57 is preferably thicker but this thickened portion only extends substantially half-way around the plate and comprises almost wholly that portion containing the teeth. Fixedly mounted on the shaft 31 immediately above the plate 57 is a circular knife 60 provided with teeth 61 which coöperate with the teeth 59 to perform the cutting operation and, of course, the knife 60 revolves in unison with the shaft 31. Positioned above the knife 60 and spaced therefrom is a member 62 fashioned in the arc of a circle approximately coincident with the toothed portion of the circular plate 57. This member 62 is provided in its outer front and lateral faces with teeth 63 which are adapted to vertically register with the teeth 59. This member 62 is supported by a pair of spacing members 64 preferably secured to the under face of the plate 57 by some means such as screws or bolts and the forward end of the member is held in spaced relation with respect to the knife 60 through the medium of a clevis-shaped member 65 the rear ends of which are arranged to carry hold-fast devices for securing the parts in position.

Fixedly mounted on the shaft 31 a slight distance above the member 62 is a drum-shaped member 66 provided with radially-projecting downwardly-turned fingers 67, the function of which is to sweep the grass, after being cut, laterally away from the cutting mechanism and to assist the arms 35 heretofore described.

Adjustably secured to the front face of the L-shaped member 24 by means of a bolt 26 is a transversely-extending slotted arm 68 and whose position may be varied either vertically or horizonally by loosening the bolt 26 and after shifting the arm to its desired position it is again rigidly secured to its support. Secured by a bolt or equivalent device 69 to the end of the arm 68 is a slotted arm 70, the slot providing means for transversely-adjusting it. Secured to the end of the arm 70 is a forwardly and slightly upwardly-extending guard 71 the function of which is to prevent the grass, after being cut or severed from the ground, from falling rearwardly or laterally into the cutting machinery. The outer end of this guard 71 is slightly upwardly and laterally-turned and is arranged to terminate above the forward portion of the drum-shaped member 66.

In operation the device is propelled forward in the usual manner and motion from the driving axle 2 to the shaft 31 is communicated by the mechanism already described, causing a rapid revolution of the knife 60 which severs the grass, and of course, if the device is drawn rearwardly the knife is inoperative. By positioning the circular plate 57 below and the arc-shaped toothed-member 62 above the knife the grass is held in place more firmly to enable the teeth of the mower to engage the same; in other words, the two members 57 and 62 serve as abutments for holding the portions of the grass on each side of the cut which the knife makes and as rapidly as the grass is severed it is swept aside by the combined efforts of the arms 35 and the fingers 67 which serve to shift it rearwardly and laterally against the guard 71 which deflects it from the path of the mower.

I claim:

1. A lawn-mower comprising in combination a horizontally-rotatable axle, a pair of ground-wheels one of which is fixedly mounted thereon, a frame comprising a pair of horizontal parallel bars positioned below said axle, a pair of upright posts on each of said bars, a pair of horizontal cross bars extending between said upright posts and adjustably secured to the latter, said cross bars provided with alined apertures to receive said axle for adjustably supporting said frame, a rotatable vertical shaft mounted on said frame in front of said axle, a toothed circular knife carried by said shaft, a fixed toothed member mounted below said knife, the teeth of which coöperate with the teeth of said knife for producing a shearing action during the cutting operation, a bracket-forming member mounted on the frame and constituting a bearing for said shaft, a pulley mounted on said shaft, a pulley mounted on said axle, a belt extending between said pulleys for communicating motion from the latter to the former, and a hollow drum fixedly mounted on said shaft and provided with a plurality of radial fingers arranged to revolve above said knife for brushing aside the severed grass.

2. A lawn mower comprising in combination a horizontal rotatable axle, a pair of ground-wheels one of which is fixedly mounted on said axle, a frame embodying a pair of parallel bars positioned below said axle, a pair of horizontal cross bars suitably apertured and mounted on said axle, a pair of posts on each of said frame-forming bars and extending upwardly through suitable openings in said cross-bars, means for connecting said posts and cross-bars for permitting the vertical adjustment of said frame with respect to said axle, a vertical rotatable shaft mounted on said frame in advance of said axle, a toothed knife carried by said shaft, a fixed toothed member mounted adjacent to said knife, the teeth of which coöperate with the teeth of said knife for producing a shearing action during the cutting operation, a pulley on said shaft, a pulley on said axle, a belt extending between said pulleys for communicating motion from the latter to the former, a hollow drum mounted on said shaft immediately above said knife and provided with radial fingers to brush the severed grass laterally, and a wheel mounted at the upper end of said shaft and provided with a plurality of curved fingers and adapted to revolve in unison with said shaft.

3. A lawn-mower comprising in combination a horizontal rotatable axle, a pair of ground-wheels one of which is fixedly mounted on said axle, a frame embodying a pair of parallel bars positioned below said axle, a pair of horizontal cross bars suitably apertured and mounted on said axle, a pair of posts on each of said frame-forming bars and extending upwardly through suitable openings in said cross bars, means for connecting said posts and cross bars for permitting the vertical adjustment of said frame with respect to said axle, a vertical rotatable shaft mounted on said frame in advance of said axle, a toothed knife carried by said shaft, a fixed toothed member mounted adjacent to said knife, the teeth of which coöperate with the teeth of said knife for producing a shearing action during the cutting operation, a tension device for imposing tension on said belt, a hollow drum mounted on said shaft immediately above said knife and provided with radial fingers to brush the severed grass laterally, and a wheel mounted at the upper end of said shaft and provided with a plurality of curved fingers and adapted to revolve in unison with said shaft.

4. A lawn-mower comprising in combination a horizontal rotatable axle, a pair of ground-wheels one of which is fixedly mounted thereon, a frame comprising a pair of parallel bars positioned below said axle, means for connecting said frame-forming bars and axle to permit the vertical adjustment of the former with respect to the latter, an operating handle embodying a bifurcated member, means connecting said handle and said frame-forming bars for adjustably holding the former in a determined position, a rotatable vertical shaft mounted on said frame in advance of said axle, a toothed circular knife carried by said shaft, a fixed toothed member mounted below said knife the teeth of which coöperate with the teeth of said knife to produce a shearing action during the cutting operation, a belt for communicating motion from said axle to said vertical shaft, and a revolving member carried by said vertical shaft for brushing aside the severed grass.

KARL RUCH.

Witnesses:
CURTIS HINMAN,
IRA A. PRIEST.

---

Copies of this patent may be obtained for five cents each, by addressing the "Commissioner of Patents, Washington, D. C."